United States Patent [19]
Behnke et al.

[11] Patent Number: 5,312,299
[45] Date of Patent: May 17, 1994

[54] GRAIN FLOW MEASURING DEVICE, IN PARTICULAR FOR HARVESTERS

[75] Inventors: Willi Behnke, Steinhagen; Norbert Diekhans, Gutersloh, both of Fed. Rep. of Germany

[73] Assignee: Claas oHG beschränkt haftende offene Handelsgesellschaft, Harsewinkel, Fed. Rep. of Germany

[21] Appl. No.: 958,707

[22] Filed: Oct. 9, 1992

[30] Foreign Application Priority Data

Oct. 14, 1991 [DE] Fed. Rep. of Germany ....... 4133976

[51] Int. Cl.$^5$ ............................................. A01F 12/00
[52] U.S. Cl. .......................................... 460/5; 56/10.2
[58] Field of Search .............. 460/1, 4, 5; 56/10.2, 56/DIG. 15

[56] References Cited

U.S. PATENT DOCUMENTS

| | | | |
|---|---|---|---|
| 3,935,866 | 2/1976 | Northup et al. | 460/4 |
| 4,230,130 | 10/1980 | Staiert | 460/5 |
| 4,517,792 | 5/1985 | Denning et al. | 56/10.2 |
| 4,902,264 | 2/1990 | Diekhans et al. | 56/10.2 X |

FOREIGN PATENT DOCUMENTS

0093991 5/1983 European Pat. Off. .
3731080 9/1989 Fed. Rep. of Germany .

Primary Examiner—Terry L. Melius
Attorney, Agent, or Firm—Browdy and Neimark

[57] ABSTRACT

A grain flow measuring device having a sensor plate, on which a piezo-crystal oscillation sensor is disposed behind an impact surface, behind which an oscillation-damping foam material body is maintained by means of doubly folded-over edges of the sensor plate located at its edges. A retainer plate is seated and an amplifier and evaluation circuit with a readable counter is disposed in the foam material body. Grain flow measuring devices of this type are disposed in a harvester below a rocker tray near its output side, because of which grain losses and false measurements are avoided. Damping of the impact surface by means of the foam material body results is such oscillation damping that the determination of the grain mass results from the detected number of oscillations.

17 Claims, 4 Drawing Sheets

GRAIN FLOW MEASURING DEVICE, IN PARTICULAR FOR HARVESTERS

FIELD OF THE INVENTION

The invention relates to a grain flow measuring device, in particular for placement in a grain flow in harvesters, having a piezoelectric oscillation sensor disposed approximately in the center of one side of a sensor plate and connected therewith, the other side of which is located in a grain flow path as an impact surface. The device has folded-over edges, where an amplifier device is disposed. The amplifier, is connected on its input side with an oscillation sensor and is spatially separated therefrom.

PRIOR ART AND BACKGROUND OF THE INVENTION

A grain flow measuring device of this type is known from German Patent Disclosure DE 37 31 080 C2. There, a long, narrow sensor plate is equipped with a piezoelectric oscillation sensor approximately in the center of its back, from which the connecting lines are routed to an amplifying circuit which is provided with a housing and is bolted to the sensor plate. From there, a connecting line is routed to an external electronic evaluation device in a multiple folded edge along the long side of the sensor plate. Along the folds on its long side, the sensor plate is bolted to retainer straps, which are fastened by means of rubber-metal connections at the outlet side of the sieve-like conveying surfaces of a rocker tray. In this way a leakage grain flow is detected by means of the sensor extending over the entire width of the rocker trays. Thereafter, the oscillation signals piezoelectrically detected at the impact of the grains are sequentially amplified, rectified, filtered, supplied to a threshold value comparator and then to a counter.

The elongated and undamped design of the sensor plate and the fastenings of the retainers and cables on it have the disadvantage that, depending on the place of impact of the grains and on the type of reflection on the edges and fastening points, very different signals occur. Not all of them get through the amplification and rectification and the threshold value discriminator and are therefore not fully detected, so that there is a relatively large uncertainty of measurement. Also, a considerable loss of grain is caused by the disposition of the sensor plate behind the end of the rocker. Furthermore, in its installed position behind the end of the rocker, the sensor plate is very much affected by subsequent processing of the straw, because some of the small pieces of chaff are hurled at great speed against the impact surface of the sensor, which generates faulty signals.

Furthermore, the disposition of a sensor plate with a piezoelectric pick-up on the output side of the end of a rocker is known from European Patent Disclosure EP 93 991 B1. In this case a grating is disposed extending past the rocker end, which is intended to keep the outflowing straw away from the impact surface. However, the grains falling on the sensor surface are lost.

SUMMARY AND OBJECTIVES OF THE INVENTION

It is the object of the invention to disclose a grain flow measuring device which achieves greater measurement accuracy and which reduces grain losses by being installed in the harvester.

This object is attained in that the entire edge area of the sensor plate is a folded-over edge, on which a doubly folded over edge is formed, the whole resulting in a frame- or box-like shape. Behind the front sensor plate and between it and the folded-over edges a body of soft foam material is inserted as a damper, in which a retainer plate is seated, separated from the sensor plate and the folded-over edges. Further advantageous embodiments are recited in the dependent claims.

The novel design of the sensor plate with doubly folded-over edges all around to form an approximately box-like shape and filling it with a body of soft foam material achieves a high degree of response sensitivity and an oscillation characteristic which is about the same over the entire impact surface which, depending on the mass of the respectively impacting grain of a given type, results in a defined number of oscillations, the amplitude of which lies above a preset threshold value.

In the undamped state, i.e. without the damping foam material body in the interior, the numerous oscillations exited by the grain impact because of multiple reflections at the end of the sensor plate would remain for 30 to 40 ms before decaying to approximately 10% of their initial amplitude, the individual oscillations lasting approximately 0.2 to 0.5 ms. In contrast thereto, the novel damping is provided in such a way, that these oscillations decay to 10% of their initial amplitude in approximately 3 ms, so that the time constant is approximately 1.5 ms. Depending on the layout of the geometry of the sensor plate and the foam rubber damping body, the ratio of successive amplitudes in the same direction of the oscillations is about 0.85 to 0.7. This consideration of the oscillation behavior can only be performed on the basis of a statistical mean, because in each case a plurality of oscillation frequencies and shapes are being simultaneously generated, so that they are superimposed on each other. Depending on the selection of the size of an evaluation threshold, a certain number of oscillations, for example three to ten, exceed this threshold, depending on how great the initial amplitude has been. In this wa the number of oscillations exceeding the threshold results in a measure of the amount of grain. It is possible to determine the number of grains from this by comparison with a mean grain mass of an average grain. In a practical manner the evaluation threshold is selected to be sufficiently high so that oscillations of lesser amplitude, caused by machine noises or bits of straw and chaff, lie below it. For this reason the evaluation threshold value suitably lies between 50% and 10% of the amplitude generated by an average grain.

The satisfactory properties of the oscillation behavior of the sensor plate with the damper have been achieved by the lack of screw or rivet connections, contact surfaces of the folded over edges, gaps at the joints or the fastening of retaining means directly on the sensor plate. The multiple folded-over edges on all sides and their contact with the damping body prevent strong, undesirable reflections from the plate ends.

The coating-free, non-rusting material of the sensor plate assures a permanent, even impact property of the surface and an even oscillation frequency and damping property of the plate. The smooth surface of the sensor plate, which is free of rivets and screws, prevents it from becoming dirty or from catching bits of straw.

Fastening in the damping body by means of a retainer plate prevents the transmission of machine noises of the rocker to the sensor plate. The amplifier and evaluation circuit is protectively housed in the sensor plate, which has the shape of a housing, and in the foam material. The electrical connection from the outside to the amplifier is led through the damping material. The continuing highly flexible cable is fastened on a retaining elbow, which is bolted to the retainer plate. The retaining elbow is removably connected with the rocker, and the highly flexible cable is routed to a plug connection on the chassis of the harvester, so that the entire sensor device is easily interchangeable.

The amplifier device contains the apparatus required for evaluating the analog oscillation measuring signals, so that only pre-processed digital signals, insensitive to inference in particular meter readings, need to be conducted through the cable. Processing of the meter readings can be performed as needed in each case by a central control device, which only requires little processing capacity.

One or a plurality of the novel sensor devices, which are palm size, are advantageously disposed in front and below the outlet side of a rocker in such a way, that it detects the usable portion of grain reaching this far for measuring. There is no interference by chaff, which often flies around at high speed in the succeeding area. No straw deflectors are required. The measured partial grain flow provides a measure of the rocker function in respect to the flow of harvested material. Falling past the collector of the grain reflected by the sensor plate is effectively prevented by a deflector plate extending from the rear rocker end close to the rear edge of the impact surface. This deflector plate provides additional protection against adherence of straw to the measuring device and against the penetration of chaff into the grain detection area.

A sensor device is advantageously disposed under each one of the outside left and right shoulder sections, so that an operation which differs over the width of the machine, particularly when moving crosswise to an incline, can be detected for measurement and can be derived from the difference between the two detected partial flows.

To simplify the setting of the evaluation of a plurality of sensor devices to a defined type of grain, it is advantageous to provide them with a mutual signal distribution circuit, by means of which a preset value for the amount of amplification of the signals and/or of the threshold value for signal evaluation can be mutually set for its amplifiers and evaluation devices. In each case, the setting can be made either via a calibrated potentiometer or a step switch with respective potentiometer resistors, or the preset value can be provided by a central control device which sends an appropriate preset value to each one of the amplifier and evaluation circuits, which is memorized there.

BRIEF DESCRIPTION OF THE DRAWINGS

Details of advantageous embodiments are illustrated by means of FIGS. 1 to 6.

DETAILED DESCRIPTION OF THE PREFERRED EMBODIMENTS

Figure 1:
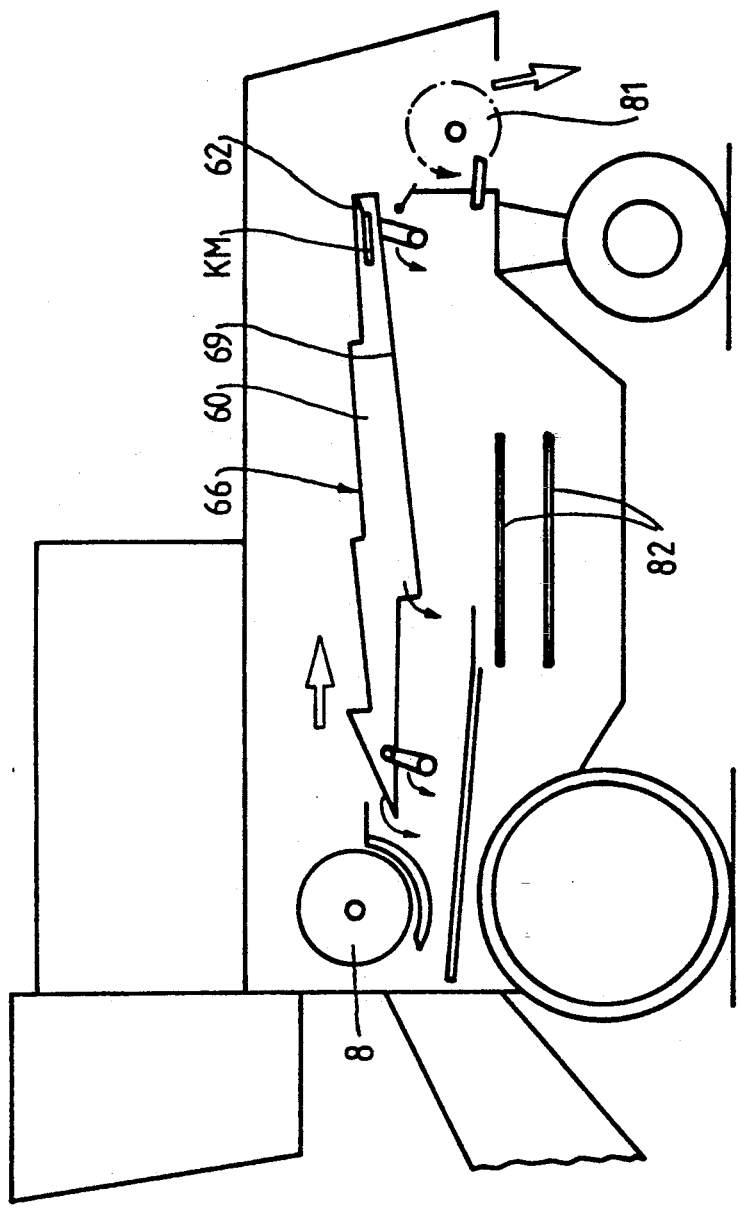
FIG. 1 is a vertical longitudinal section through a combine with a grain flow measuring device.

FIG. 1 is a whole cross section of a combine. The rocker 66 with the grain flow measuring device KM and the deflector plate 62 is disposed behind its threshing cylinder 8. A chaff cutter 81 for the straw is disposed behind this. The grains fall through the slits in the rocker trays 60 onto the tray bottom 69 and flow over its lower edge into the sifting device 82 placed thereunder.

Figure 2:
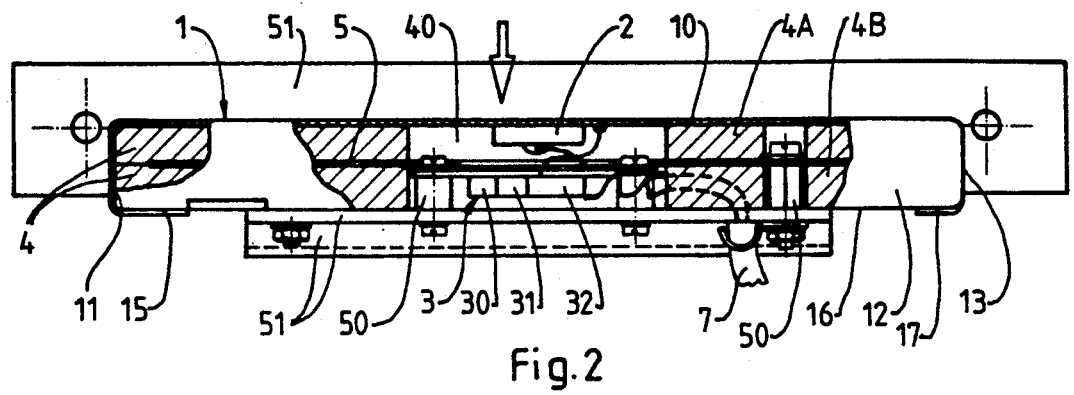
FIG. 2 is a longitudinal side elevation view of a grain flow measuring device, partially exposed.

A view on the long side of a sensor device is shown in FIG. 2, which is partially cut as far as the center. The sensor plate 1 is embodied in the shape of a box with lateral folded-over edges 11, 12, 13, which are further folded over in the shape of a box to form doubly folded-over edges 15, 16, 17. Thus, the impact surface 10 on the front side of the sensor plate 1 is completely free of obstacles and deflects impacting grains well, since it is made of a non-rusting steel plate with a thickness of approximately 0.5 to 1 mm. On the inside, the sensor plate I is filled with a soft body 4 of foam material, so that all doubly folded-over edges 11 to 17 are in contact with it over the entire area. Approximately in the center, the foam material body 4 has a cutout 40 to receive a piezo-quartz piece 2, which is fastened on the sensor plate 1 in a known manner on the side facing away from the impact surface 10. The foam material body 4 preferably consists of two foam material plates 4A, 4B of a soft foam rubber, between which a retainer plate 5 is centrally and resiliently maintained, the distance of its edges being at least 1 cm away from the folded-over edges 11 to 13. Each of the foam rubber plates 4A, 4B is approximately 1 to 2 cm thick. The retainer plate 5 is connected by means of retaining bolts 50 with a retaining elbow 51, which is supported over a large area in the center of the foam material body 4. It has a distance of at least 1 cm from the doubly folded-over edges 14 to 16 on all sides.

An amplifier device 3 is disposed in the cutout 40, one end of which is connected by means of highly flexible connecting lines with the piezo-crystal sensor 2 and the other end of which is connected with the lines of a connecting cable 7, a section of which is conducted through the foam material body 4 and strapped to the retaining elbow 51.

Figure 3:
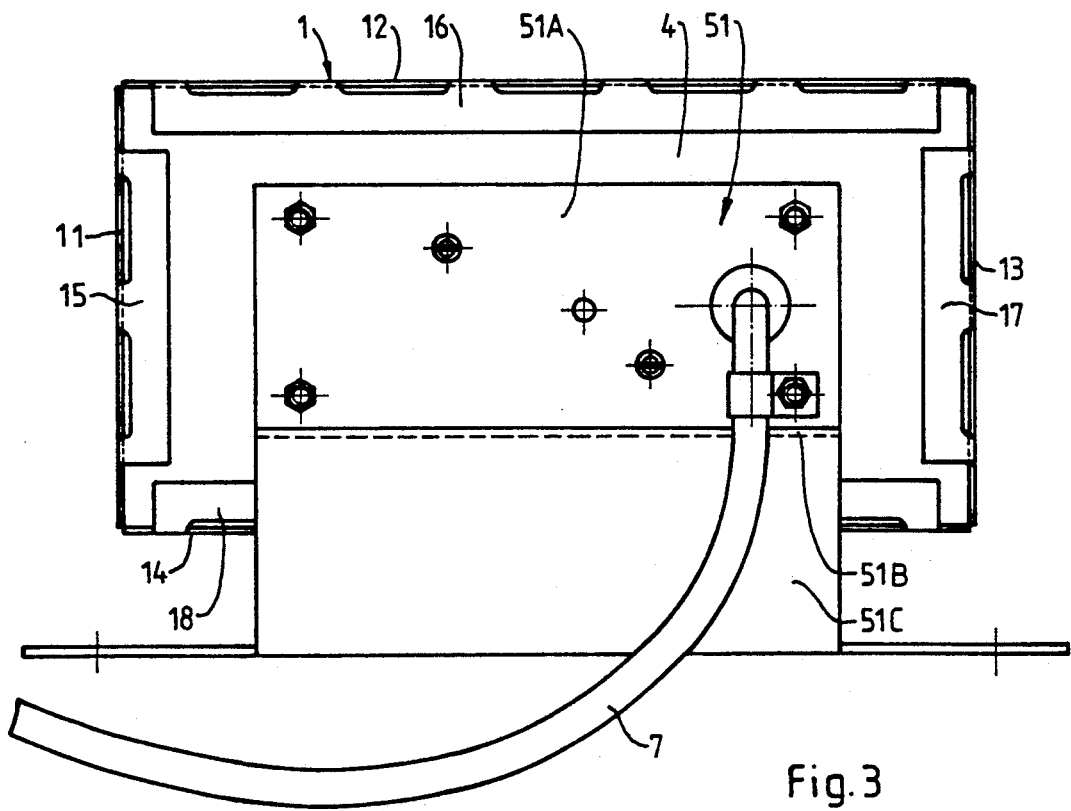
FIG. 3 is a bottom view of a measuring device.

FIG. 3 is a view of the sensor device from the direction of the fastening side of the retaining elbow. The sensor plate 1 has four folded-over edges 11 to 14 on its four sides, each of which are followed by 1 to 2 cm wide doubly folded-over edges 15 to 18. The singly and doubly folded-over edges 11 to 18 are cut free at the ends, so that no clinking oscillation transmission can occur there.

For limiting the support area 51A adjoining the foam material body 4, the retaining elbow 51 has a angled step 51B, so that the free elbow section 51C does not touch the adjoining doubly folded-over edge 18.

Figure 4:
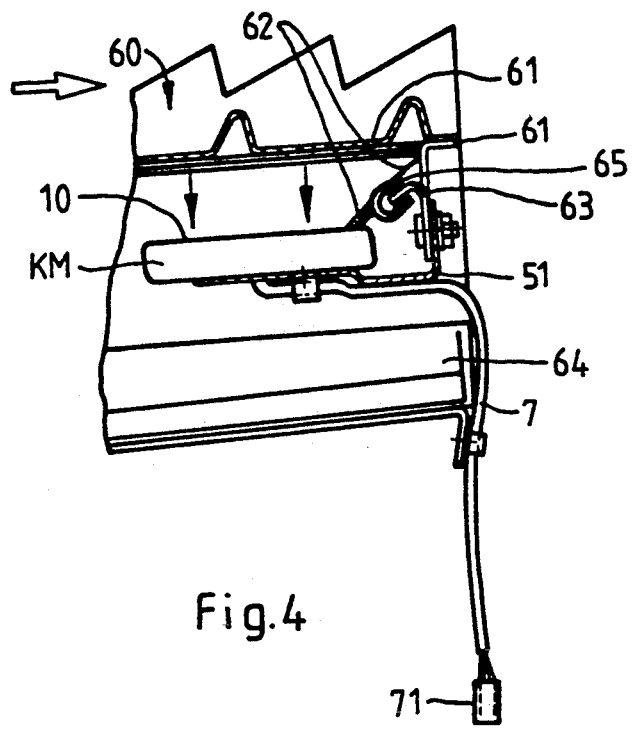
FIG. 4 shows the outlet end of a rocker tray in a section along the line III—III of FIG. 5.

FIG. 4 shows a lateral view of a rocker tray 60 of a harvester, in which a grain flow measuring device KM is disposed at a distance below the tray end 61, at a side where the straw exits, through a sieve-like conveying surface on the rocker tray 60. The impact surface 10 of the device is disposed slightly inclined, looking in the direction of travel of the combine, so that impacting grains fall to a large extent in the catch trough 64 located under it. Furthermore, the measuring device KM is removably connected via a retainer 63 with the retaining elbow 51 at the conveying surface 61. A plug-in device 65 is also maintained on the retainer 63 for a deflector plate 62, which extends at an angle of approximately 45 degrees from the end of the rocker sifter end 61 to the adjoining impact surface edge and terminates closely beside or above it. The connecting cable 7 is fastened on the chassis side by means of a strain relief device and is removably connected with a central electronic control by means of a plug 71.

Figure 5:
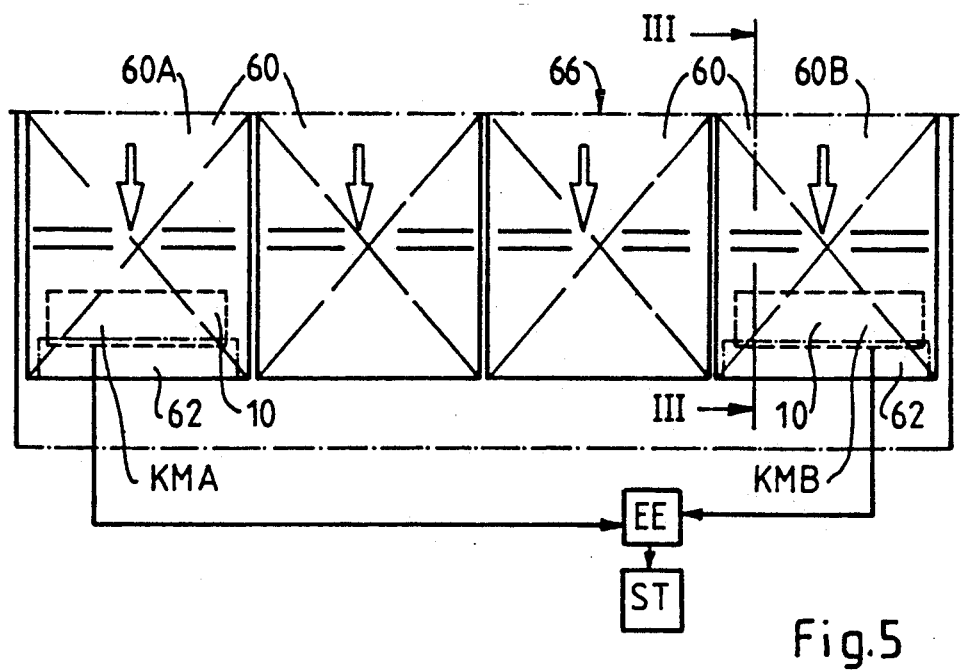
FIG. 5 is a cut of a harvesting device with two grain flow measuring devices.

FIG. 5 is a view of a cut of a harvester showing the entire rocker device 66. Customarily this consists of a plurality of parallel rocker trays 60 which are moved via a crank gear. Grain flow measuring devices KMA, KMB are disposed in the two outer rocker trays 60A, 60B. Their cables 7 are led to a common electronic setting device EE, from which a cable connection extends to a central electronic control and evaluation device ST which is, for example, a standard CAN data transmission connection. The deflector plates are disposed between the grain flow measuring sensors KMA, KMB and the tray ends 61.

Figure 6:
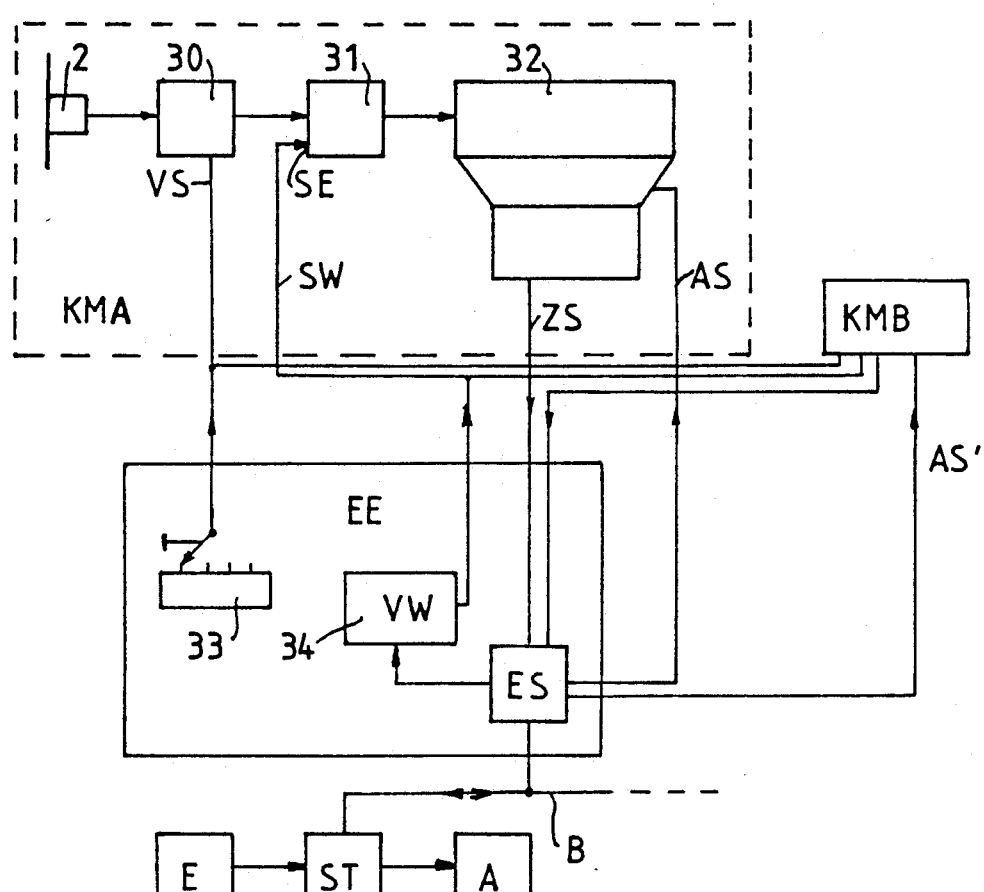
FIG. 6 is a block diagram with a central electronic evaluation device.

FIG. 6 is a block diagram of the amplifier device of a grain flow measuring device KMA and of the common intermediate circuit EE connected with it, and of the central electronic control ST.

The input side of the piezo-crystal signal receiver 2 is connected to an amplifier 30, the amplification of which is controllable, the output signal of which is supplied to a threshold value comparator 31. Its threshold value input SE is supplied with a pre-settable threshold value SW, and its pulse-shaped output signal is supplied to the counter input of a digital counter 32.

Setting circuits 33, 34 for an amplifier control signal VS and a threshold value SW are located in the intermediate circuit EE, which are not only supplied to the amplifier 30 shown in detail and to the threshold value comparator 31, but are also supplied in parallel to further amplifiers and threshold value circuits of further grain flow measuring devices KMB. The setting circuits 33, 34 can be manually operated step potentiometers 33 or electronic signal holding circuits 34, which can be loaded with a preset value VW by the control device ST. One of each is shown by way of example.

The control device ST is connected via a data transfer bus B with the intermediate circuit EE, which decodes the commands of the control device ST in a decoding circuit ES and accordingly either takes up a preset value VW in a signal holding circuit 34 or emits a polling signal AS, AS', which can consist of a pulse sequence, and polls the meter reading ZS of the counter 32 and transmits it to the central control device ST for further processing and storage. The control device ST has an entering device E, for example a command keyboard, by means of which a preset value VW specific to the type of grain can be preset directly or by association with a table. Furthermore, a display device A is connected to the control device ST for issuing the meter readings or amounts of grain determined therefrom by means of the program or differences in amounts. If a plurality of grain flow measuring devices KMA, KMB are connected to the intermediate circuit EE, the meter readings ZS are sequentially polled, for which purpose different polling signals AS, AS' are transmitted by the decoding circuit ES.

What is claimed is:

1. A grain flow measuring device for placement in a grain flow of a grain harvester, said measuring device comprising;

a sensor plate (1)

a peizoelectric oscillation sensor (2), said peizoelectric oscillation sensor (2) located and engaged at a center of one side of said sensor plate (1), an opposite side of said sensor plate located in a grain flow path as an impact surface (10), an amplifier device (3) in said measuring device and spaced from and connected to an input of said oscillation sensor (2), wherein, an entire edge area of said sensor plate (1) has folded-over edges (11, 12, 13, 14), each of said folded-over edges having a doubly folded-over edge forming with said sensor plate and said folded-over edges, a box-like frame, a soft foam damper material inserted within said frame and a retainer plate (5) seated in said soft damper material spaced apart from said frame.

2. A grain flow measuring device in accordance with claim 1, wherein said each of said folded-over edges and each said doubly folded-over edge are cut free so they do not touch each other.

3. A grain flow measuring device in accordance with claim 1 wherein said retainer plate (5) supports said amplifier device (3) and is fastened on a retaining elbow (51) by means of retaining bolts (50).

4. A grain flow measuring device in accordance with claim 3, wherein said retaining elbow (51) is resiliently supported in an area between said each doubly folded-over edge (15, 16, 17 and 18) at a distance from said foam material body (4).

5. A grain flow measuring device in accordance with claim 1, wherein said impact surface (10) is approximately rectangular and has lateral dimensions between 50 mm and 250 mm, and wherein said folded-over edges (11, 12, 13 and 14) have a height of 15 to 30 mm.

6. A grain flow measuring device in accordance with claim 5, wherein said sensor plate (1) consists of non-rusting steel of a thickness of 0.5 mm to 1 mm.

7. A grain flow measuring device in accordance with claim 5 wherein said foam material body (4) is made of natural or artificial rubber which has a degree of damping selected to be sufficiently great that an oscillation generated on said impact surface (10) decays in 2 to 5 ms to approximately 10% of its initial amplitude.

8. A grain flow measuring device in accordance with claim 1, wherein said amplifier device (3) comprises an amplifier (30), having a degree of amplification which can be controlled, said amplifier having an output signal supplied to a threshold value comparator (31), said value comparator having a pulse-shaped output signal which is supplied to a digital counter (32) at a counter input, said digital counter having a meter reading (ZS) which can be read out and controlled by a counter polling signal (AS).

9. A grain flow measuring device in accordance with claim 8, wherein a control side of said amplifier (30) is connected with a step potentiometer (33).

10. A grain flow measuring device in accordance with claim 8, wherein said control side of said amplifier (30) or a threshold input (SE) of a threshold value comparator (31) are connected with a control signal holding circuit (34), which can be loaded with a preset value (VW).

11. A harvester with at least one grain flow measuring device (KM, KMA, KMB) in accordance with claim 1, wherein said at least one grain flow measuring device is disposed near a sieve-like conveying surface

(61) at a distance below the same and connected therewith.

12. A harvester in accordance with claim 11, wherein a deflector plate (62) is disposed between said conveying surface (61) and an end of said impact surface (10) oriented towards it at a small distance therefrom.

13. A harvester in accordance with claim 11 wherein said the deflector plate (62) is pluggably maintained in said conveying surface (61).

14. A harvester in accordance with claim 11, wherein a grain flow measuring device (KMA, KMB) is disposed on either one of a rocker tray (60A, 60B) located on a right and a left of said harvester.

15. A harvester in accordance with claim 14, wherein an amplifier control signal (VS) and/or a threshold value (SW) from a common step potentiometer (33) is supplied to grain flow measuring devices (KMA, KMB).

16. A harvester in accordance with claim 14, wherein said two grain flow measuring devices (KMA, KMB) are connected with a common central electronic control and evaluation device (ST), which supplies them in a program-controlled manner with a counter polling signal (AS, AS') and takes over the respectively transmitted meter reading (ZS).

17. A harvester in accordance with claim 16, said central electronic control and evaluation device (ST) has a control signal holding circuit (34) with a preset value (VW) in a program-controlled manner through an input device (E) as a function of an input.

* * * * *